United States Patent
Cejnek et al.

(10) Patent No.: US 8,550,678 B2
(45) Date of Patent: Oct. 8, 2013

(54) HEADLAMP WITH DAY/NIGHT FRONT VEHICLE POSITION

(75) Inventors: Milan Cejnek, Novy Jicin (CZ); Rainer Neumann, Stuttgart (DE); Zdenek Geryk, Frenstat pod Radhostem (CZ)

(73) Assignees: Varroccorp Holding BV (NL); Varroc Engineering Private Limited (IN); Varroc Lighting Systems S.R.O. (CZ)

( * ) Notice: Subject to any disclaimer, the term of this patent is extended or adjusted under 35 U.S.C. 154(b) by 17 days.

(21) Appl. No.: 13/035,179

(22) Filed: Feb. 25, 2011

(65) Prior Publication Data
US 2011/0228546 A1    Sep. 22, 2011

(30) Foreign Application Priority Data
Mar. 22, 2010 (CZ) .................. PV2010-211

(51) Int. Cl.
*F21V 29/00* (2006.01)

(52) U.S. Cl.
USPC ........... 362/544; 362/506; 362/507; 362/508; 362/543; 362/545

(58) Field of Classification Search
USPC .................. 362/506, 507, 508, 543, 544, 545
See application file for complete search history.

(56) References Cited

U.S. PATENT DOCUMENTS

| | | | |
|---|---|---|---|
| 4,949,226 A * | 8/1990 | Makita et al. ................. | 362/538 |
| 5,075,593 A | 12/1991 | Shoda | |
| 6,650,058 B1 * | 11/2003 | Wang ............................. | 315/82 |
| 6,789,929 B1 * | 9/2004 | Doong et al. ................. | 362/511 |
| 7,654,714 B2 * | 2/2010 | Mochizuki et al. ........... | 362/539 |
| 7,993,045 B2 * | 8/2011 | Nakamura et al. ............ | 362/545 |
| 2003/0031020 A1 * | 2/2003 | Komatsu ....................... | 362/465 |
| 2004/0027834 A1 * | 2/2004 | Chigusa et al. .............. | 362/511 |

FOREIGN PATENT DOCUMENTS

| | | |
|---|---|---|
| DE | 10140277 A1 | 2/2003 |
| DE | 202004005359 U1 | 6/2004 |
| DE | 602005002442 T2 | 6/2008 |

* cited by examiner

*Primary Examiner* — Robert May
*Assistant Examiner* — Tsion Tumebo
(74) *Attorney, Agent, or Firm* — Cantor Colburn LLP

(57) ABSTRACT

A headlight for a motor vehicle with light unit for daytime and nighttime front navigation light and a supplemental distance light unit, in addition to an at least one optical module (3), with light source (2). The light sources (61, 62) of the supplemental unit (7) are supplied with alternating electric current, for creation of the front nighttime navigation light when supplied with low electric current, or the front daytime navigation light when supplied with medium electric current, and when supplied with the highest electric current, a supplemental distance beam in addition to the distance light beam emerging from the optical module (3).

7 Claims, 1 Drawing Sheet

HEADLAMP WITH DAY/NIGHT FRONT VEHICLE POSITION

CROSS REFERENCE TO RELATED APPLICATION

This application claims the benefit of Czech Republic Patent Application No. PV2010-211 filed Mar. 22, 2010, entitled "Headlight For A Motor Vehicle With Light Unit For Daytime And Nighttime Front Navigation Light And Supplemental Distance Light," the entire disclosure of the application being incorporated by reference herein.

BACKGROUND OF THE INVENTION

1. Technical Field

The invention in general concerns the front headlight of a motor vehicle with light unit for daytime and nighttime front navigation light and a supplemental distance light.

2. Discussion

Present-day designs for the headlights of a motor vehicle have separate daytime and nighttime front navigation light units, which do not contribute their light to the distance beam—see, e.g., the solution of patent specification DE 10140277. One drawback to these headlight designs is high manufacturing costs. Current optical modules of projector types with halogen bulbs, HID discharge or LED light sources many times do not generate a sufficiently robust distance beam helpful for seeing distant objects by the driver. One issue with current systems is balancing the light output at a distance to safely see upcoming objects, while ensuring a safe broad visibility range in front of the vehicle.

SUMMARY OF THE INVENTION

The aforementioned drawbacks are eliminated by a headlight for a motor vehicle with light unit for daytime and nighttime front navigation light and a supplemental distance light. The headlight includes a casing, provided at its front open end with a transparent cover and on the inside with at least one optical module having a light source and a connector. The headlight also includes between the casing and the transparent cover of the headlight, a supplemental light unit. The light sources of the supplemental unit are supplied with alternating electric current, and when supplied with a low level of electric current, create the front nighttime navigation light. When the supplemental unit is supplied with a medium level of electric current, it creates the front daytime navigation light and when supplied with the highest level of electric current, creates the supplemental distance beam with the distance light beam emerging from the optical module.

Another feature of the indicated headlight is that the alternating power supply of the light sources of the supplemental unit causes low side scatter, primarily the ones used to create the supplemental distance beam for the main distance light beam emerging from the optical module, is implemented by their gradual turning on.

Another feature is that the alternating power supply of the light sources of the supplemental unit with broad side scatter, primarily those used to create the front nighttime navigation light and the front daytime navigation light implemented by modulating the width of the electric pulse.

Yet another feature is that the light sources of the supplemental unit are of LED and/or bulb type, namely sources with optics having small side scatter and sources with optics having broad side scatter, or the optical module is of reflector or projector type, and the light source in the optical module is a halogen bulb or high-pressure discharge, or the light source in the optical module is of LED type.

The advantage of this design arrangement of the headlight is increased power of the distance light beam to the required level, ensuring a safe driving and sufficient visibility at the greatest distance, as needed.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
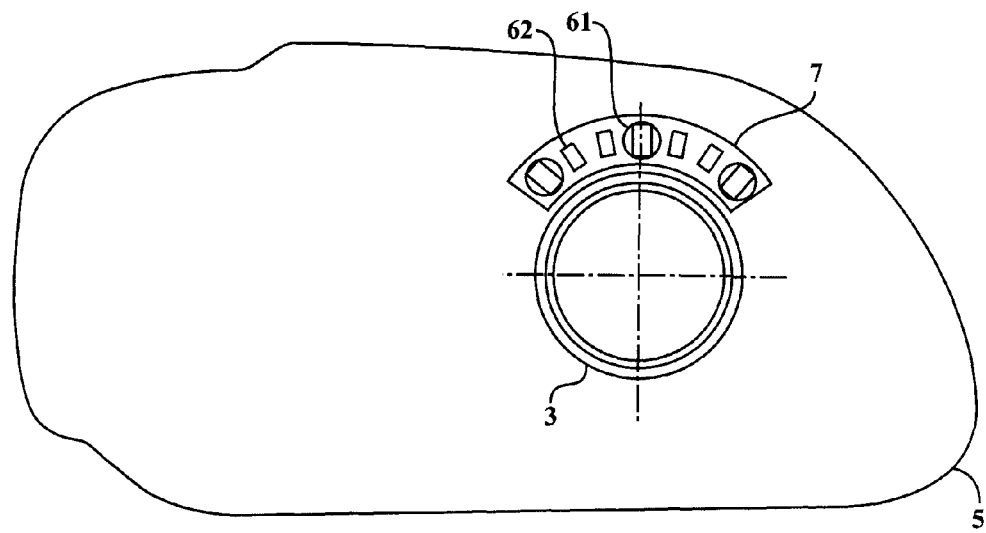
FIG. 1 is a front view of the front headlight.
Figure 2:
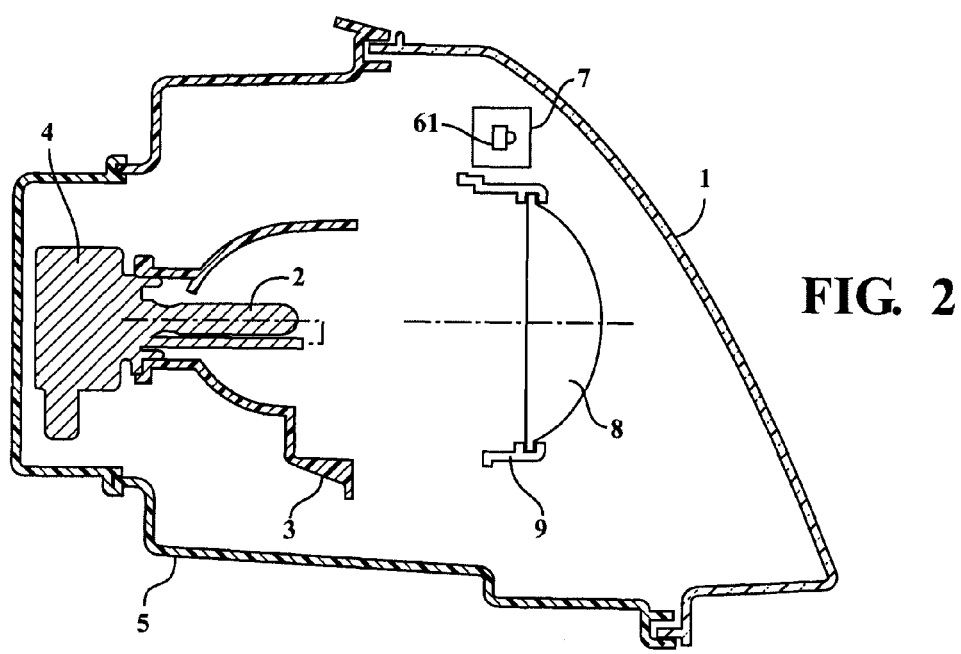
FIG. 2 is a cross-sectional view of the headlight in FIG. 1.

The front headlight of a motor vehicle, see FIGS. 1 and 2, includes a casing (5), provided at its front open end with a transparent cover (1) and on the inside with at least one optical module (3), with light source (2) and with a connector (4). Between the at least one optical module (3) and the adjacent circumferential inner surface of the casing (5) or the transparent cover (1) of the headlight is a supplemental light unit (7).

The daytime/nighttime dipped navigation lights should cover a broad polygonal space of 40×20 degrees in front of the driver of the vehicle. On the other hand, the optimal distance light beam can be limited to a polygonal space of only 10×5 degrees.

For these purposes, the light sources (61, 62) of the supplemental unit (7) are supplied with alternating electric current, for creation of the front nighttime navigation light when supplied with low electric current, or the front daytime navigation light when supplied with medium electric current, and for creation of a supplemental distance beam in addition to the distance light beam emerging from the optical module (3) when they are supplied with the highest electric current.

The alternating power supply of the light sources (61) of the supplemental unit (7) with low side scatter, primarily the ones used to create the distance beam for the distance light beam emerging from the optical module (3), is implemented by their gradual turning on, while the alternating power supply of the light sources (62) of the supplemental unit (7) with broad side scatter, primarily those used to create the front nighttime navigation light and the front daytime navigation light, is implemented by modulating the width of the electric pulse.

The optical module (3) can be of reflector or projector type, and the light sources (61, 62) of the supplemental unit (7) can be of LED and/or bulb type with small side scatter and optics with broad side scatter.

Accordingly, the light source (2) in the optical module (3) can be a halogen bulb or a high-pressure discharge, or the light source (2) in the optical module (3) can be of LED type.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. The headlight for a motor vehicle with light unit for daytime and nighttime front navigation light and a supplemental distance light comprising:

a casing (5), provided at its front open end with a transparent cover (1) and on the inside with at least one optical module (3), with a light source (2) and with a connector (4), while between the casing (5) and the transparent cover (1) of the headlight is a supplemental light unit (7), wherein the light sources (61, 62) of the supplemental unit (7) are supplied with a variable electric current, for creation of the front nighttime navigation front position light when supplied with low electric current, or the front daytime navigation running light when supplied with medium electric current, and for creation of a supplemental distance beam in addition to the distance high (driving) beam emerging from the optical module (3) when they are supplied with the highest electric current, said light sources (61, 62) comprising first light sources having optics emitting a narrow light beam and second light sources having optics emitting a wide light beam.

2. The headlight for a motor vehicle with light unit for daytime and nighttime front navigation light and a supplemental distance light comprising:

a casing (5), provided at its front open end with a transparent cover (1) and on the inside with at least one optical module (3), with a light source (2) and with a connector (4), while between the casing (5) and the transparent cover (1) of the headlight is a supplemental light unit (7), wherein the light sources (61, 62) of the supplemental unit (7) are supplied with variable electric current, for creation of the front nighttime navigation light when supplied with low electric current, or the front daytime navigation light when supplied with medium electric current, and for creation of a supplemental beam in addition to the distance light beam emerging from the optical module (3) when they are supplied with the highest electric current, said light sources (61, 62) comprising first light sources having optics emitting a narrow light beam and second light sources having optics emitting a wide light beam wherein the variable power supply of the first light sources (61) of the supplemental unit (7) comprising the ones used to create the supplemental distance beam for the distance light beam emerging from the optical module (3), is implemented by their gradual turning on.

3. The headlight for a motor vehicle with light unit for daytime and nighttime front navigation light and a supplemental distance light comprising:

a casing (5), provided at its front open end with a transparent cover (1) and on the inside with at least one optical module (3), with a light source (2) and with a connector (4), while between the casing (5) and the transparent cover (1) of the headlight is a supplemental light unit (7), wherein the light sources (61, 62) of the supplemental unit (7) are supplied with variable electric current, for creation of the front nighttime navigation light when supplied with low electric current, or the front daytime navigation light when supplied with medium electric current, and for creation of a supplemental beam in addition to the distance light beam emerging from the optical module (3) when they are supplied with the highest electric current, said light sources (61, 62) comprising first light sources having optics emitting a narrow light beam and second light sources having optics emitting a wide light beam wherein the variable power supply of the second light sources (62) of the supplemental unit (7) comprising those used to create the front nighttime navigation light and the front daytime navigation light, is implemented by modulating the width of the electric pulse.

4. The headlight for a motor vehicle with light unit for daytime and nighttime front navigation light and a supplemental distance light comprising:

a casing (5), provided at its front open end with a transparent cover (1) and on the inside with at least one optical module (3), with a light source (2) and with a connector (4), while between the casing (5) and the transparent cover (1) of the headlight is a supplemental light unit (7), wherein the light sources (61, 62) of the supplemental unit (7) are supplied with variable electric current, for creation of the front nighttime navigation light when supplied with low electric current, or the front daytime navigation light when supplied with medium electric current, and for creation of a supplemental beam in addition to the distance light beam emerging from the optical module (3) when they are supplied with the highest electric current wherein the light sources (61, 62) of the supplemental unit (7) are of LED and/or bulb type, and said light sources comprising first light sources having optics emitting a narrow light beam and second light sources (62) having optics emitting a wide light beam.

5. The headlight according to claim 1, wherein the optical module (3) is of reflector or projector type.

6. The headlight according to claim 1, wherein the light source (2) in the optical module (3) is a halogen bulb or high-pressure discharge.

7. The headlight according to claim 1, wherein the light source (2) in the optical module (3) is of LED type.